US008665594B2

(12) United States Patent
Pegg

(10) Patent No.: US 8,665,594 B2
(45) Date of Patent: Mar. 4, 2014

(54) PORTABLE ELECTRONIC DEVICE SLIDABLE IN A PLURALITY OF DIRECTIONS FOR ALIGNING THE SURFACES OF THE KEYPAD AND DISPLAY PORTIONS

(75) Inventor: Albert Murray Pegg, Cambridge (CA)

(73) Assignee: BlackBerry Limited, Waterloo, Ontario (CA)

( * ) Notice: Subject to any disclaimer, the term of this patent is extended or adjusted under 35 U.S.C. 154(b) by 427 days.

(21) Appl. No.: 13/035,260

(22) Filed: Feb. 25, 2011

(65) Prior Publication Data
US 2012/0218688 A1 Aug. 30, 2012

(51) Int. Cl.
*H05K 5/00* (2006.01)
*H05K 7/00* (2006.01)
*G06F 1/16* (2006.01)
*H04M 1/00* (2006.01)

(52) U.S. Cl.
USPC .............. 361/679.56; 361/679.3; 361/679.55; 455/575.4

(58) Field of Classification Search
USPC .......... 361/679.3, 679.55, 679.56; 455/575.1, 455/575.4
See application file for complete search history.

(56) References Cited

U.S. PATENT DOCUMENTS

| 7,889,483 | B2 * | 2/2011 | Sip et al. | 361/679.11 |
| 8,180,417 | B2 * | 5/2012 | Kim et al. | 455/575.4 |
| 2008/0307607 | A1 * | 12/2008 | Kim et al. | 16/330 |

FOREIGN PATENT DOCUMENTS

| EP | 1585316 | 10/2005 |
| EP | 1667408 | 6/2006 |
| EP | 1796351 | 6/2007 |
| EP | 1804468 | 7/2007 |

OTHER PUBLICATIONS

Extended European Search Report, European Patent Office, for European Patent Application Serial No. 11156109.8, mailed Jul. 4, 2011.
Response to Extended European Search Report, Ipulse, for European Patent Application Serial No. 11156109.8 dated Aug. 26, 2011.
Notice of Intent to Grant, European Patent Office, for European Patent Application Serial No. 11156109.8 dated Oct. 1, 2012.

(Continued)

*Primary Examiner* — Anthony Haughton
(74) *Attorney, Agent, or Firm* — Bereskin & Parr LLP

(57) ABSTRACT

According to one aspect, a portable electronic device including a first portion having a first surface, a second portion having a second surface, and a slide portion slidably coupled to the first and second portions. The first portion, second portion and slide portion are adapted so that the first portion can slide along a first direction between a closed position wherein the first portion at least partially covers the second surface, and an extended position wherein the second surface is at least partially exposed, and when the first portion is in the extended position, the first portion and slide portion can slide relative to the second portion along a second direction into an open position in which the first surface and the second surface are aligned.

20 Claims, 8 Drawing Sheets

(56) References Cited

OTHER PUBLICATIONS

Webpage downloaded from PRLOG website entitled "PESUNG P9000 Dual Card Tri-Band TV Side Slide Phone Only $135.0 from Actfind.com". Published on Jan. 20, 2009. Retrieved from the Internet: <http://www.prlog.org/10169772-pesung-p9000-dual-card-tri-band-tv-side-slide-phone-only-1350-from-actfindcom.html>.

Webpage downloaded from PC Magazine website entitled "LG VX9400". Published on Mar. 23, 2007. Retrieved from the Internet: <http://www.pcmag.com/article2/0,2817,2105677,00.asp>.

Webpage downloaded from Techshout website entitled "Fujitsu F906i Mobile Phone: Rotate its Screen". Published on May 31, 2008. Retrieved from the Internet: <http://www.techshout.com/mobile-phones/2008/31/fujitsu-f906i-mobile-phone-rotate-its-screen/>.

Webpage downloaded from Geekalerts website entitled "Swivel Widescreen Multimedia Cell Phone". Published on Sep. 9, 2008. Retrieved from the Internet: <http://www.geekalerts.com/swivel-widescreen-multimedia-cell-phone/>.

Webpage downloaded from YouTube website entitled "N9 Quad band FM TV Slide Phone". Published on Feb. 3, 2009. Retrieved from the Internet: <https://www.youtube.com/watch?v=7UwDJNPq6_g>.

* cited by examiner

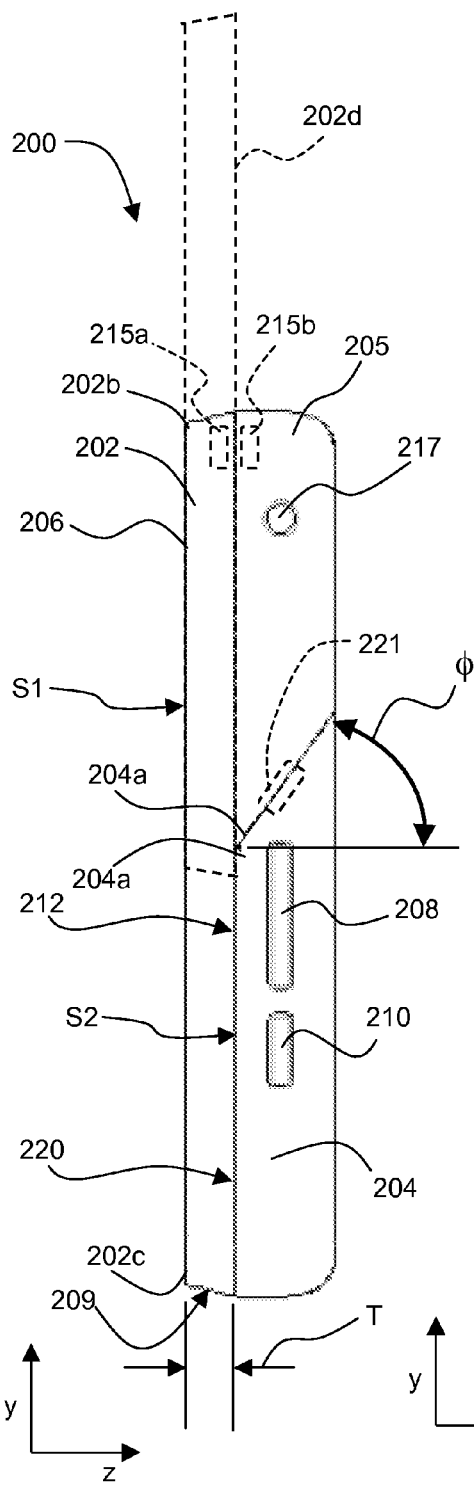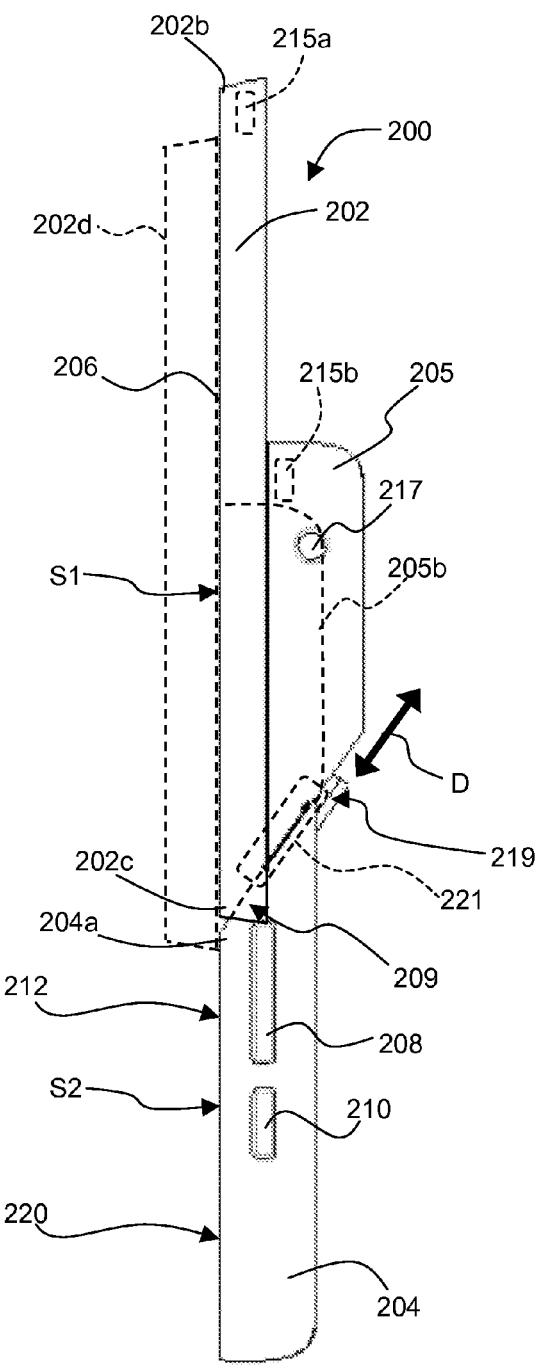
FIG. 4
FIG. 5

PORTABLE ELECTRONIC DEVICE SLIDABLE IN A PLURALITY OF DIRECTIONS FOR ALIGNING THE SURFACES OF THE KEYPAD AND DISPLAY PORTIONS

FIELD

Embodiments herein relate to portable electronic devices, and more particularly to slidable portable electronic devices having a display portion and a keypad portion slidable between an open position and a closed position.

INTRODUCTION

Electronic devices, including portable electronic devices, have gained widespread use and may provide a variety of functions including, for example, telephonic, electronic text messaging and other personal information manager (PIM) application functions. Portable electronic devices can include mobile stations such as simple cellular phones, smart phones, Personal Digital Assistants (PDAs), tablets and laptop computers.

Some handheld devices are touch-sensitive devices having a display, such as a liquid crystal display (LCD), with a touch-sensitive overlay. These touch sensitive devices may be useful, as handheld devices tend to be small and therefore limited in space available for user input and output devices. Further, these touch-sensitive devices allow a variety of input and output configurations, for example, because the screen content on the touch-sensitive devices may change depending on the functions and operations being performed.

Sometimes it may be desirable to have a second input device that is distinct from the touch sensitive display, and which may have a keypad or other input devices thereon.

BRIEF DESCRIPTION OF THE DRAWINGS

Embodiments of the present disclosure will now be described, by way of example only, with reference to the attached figures, wherein:

FIG. 4 is a side view of the portable electronic device of FIG. 2 shown in the closed position;

FIG. 5 is a side view of the portable electronic device of FIG. 2 shown in the open position;

DETAILED DESCRIPTION

Figure 1:
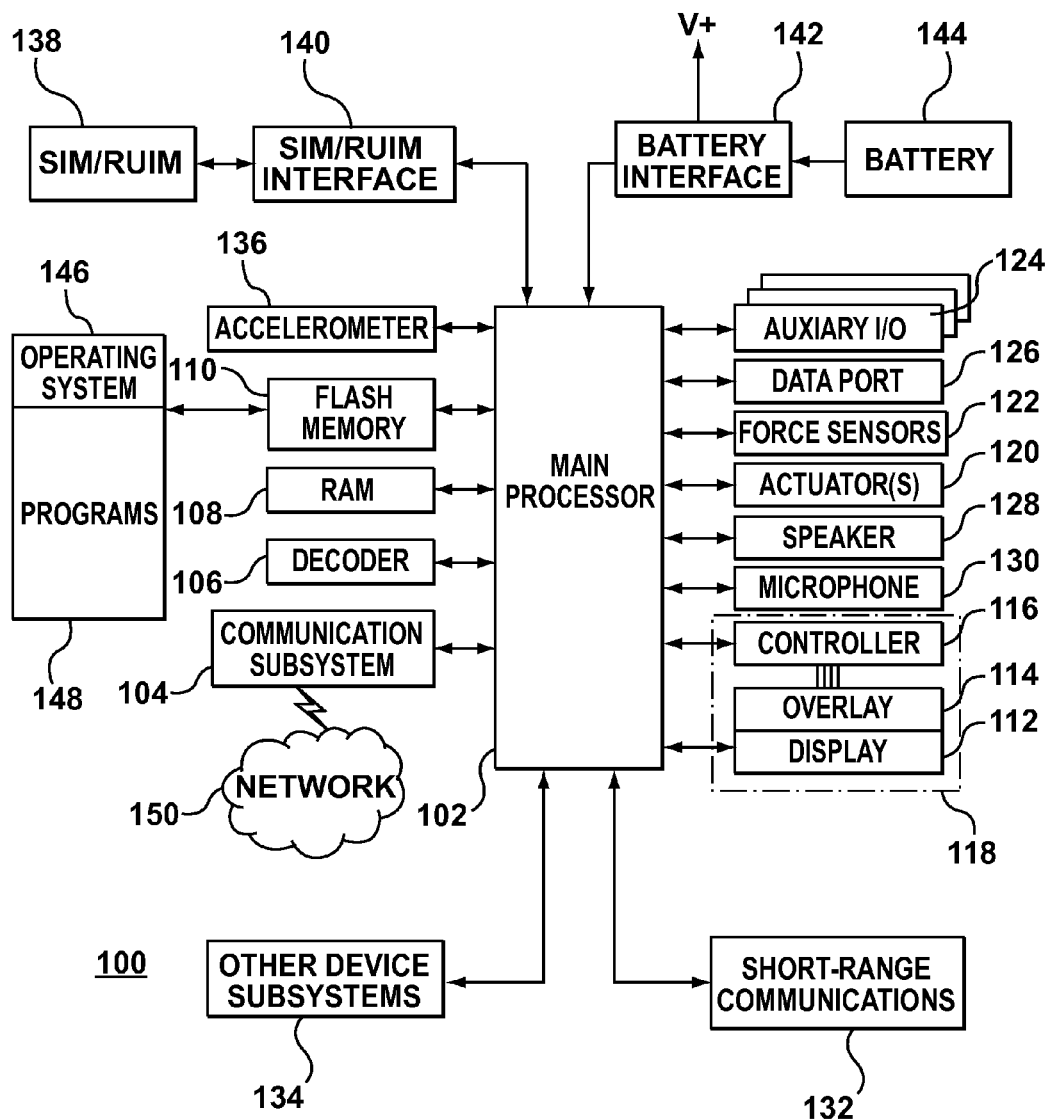
FIG. 1 is a simplified block diagram of components of a portable electronic device.

Described herein are various portable electronic devices that may include a touch-sensitive display disposed on a first portion, a keypad disposed on a second portion, a third portion that couples the first and second portions together, and functional components such as a computer memory and a processor.

It will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures and components have not been described in detail so as not to obscure the example embodiments described herein. Also, the description is not to be considered as limited to the scope of the example embodiments described herein.

FIG. 1 shows a simplified block diagram of components of a portable electronic device 100. The portable electronic device 100 includes multiple components, such as a processor 102, that control the operations of the portable electronic device 100. Communication functions, including data communications, voice communications, or both may be performed through a communication subsystem 104. Data received by the portable electronic device 100 may be decompressed and decrypted by a decoder 106. The communication subsystem 104 may receive messages from and send messages to a wireless network 150.

The wireless network 150 may be any type of wireless network, including, but not limited to, data-centric wireless networks, voice-centric wireless networks, and dual-mode networks that support both voice and data communications.

The portable electronic device 100 may be a battery-powered device and may include a battery interface 142 as shown for receiving one or more rechargeable batteries 144.

The processor 102 interacts with additional subsystems such as a Random Access Memory (RAM) 108, a flash memory 110, a display 112 (e.g. with a touch-sensitive overlay 114 connected to an electronic controller 116 that together comprise a touch-sensitive display 118), an actuator assembly 120, one or more optional force sensors 122, an auxiliary input/output (I/O) subsystem 124, a data port 126, a speaker 128, a microphone 130, short-range communications systems 132 and other device subsystems 134.

In some embodiments, user-interaction with the graphical user interface may be performed through the touch-sensitive overlay 114. The processor 102 may interact with the touch-sensitive overlay 114 via the electronic controller 116. Information, such as text, characters, symbols, images, icons, and other items that may be displayed or rendered on a portable electronic device may be generated by the processor 102 and displayed on the touch-sensitive display 118.

The processor 102 may also interact with an accelerometer 136 as shown in FIG. 1. The accelerometer 136 may be utilized for detecting direction of gravitational forces or gravity-induced reaction forces.

To identify a subscriber for network access according to the present embodiment, the portable electronic device 100 may use a Subscriber Identity Module or a Removable User Identity Module (SIM/RUIM) card 138 inserted into a SIM/RUIM interface 140 for communication with a network (such as the wireless network 150). Alternatively, user identification information may be programmed into the flash memory 110 or performed using other techniques.

The portable electronic device 100 also includes an operating system 146 and software components or programs 148 that are executed by the processor 102 and which may be stored in a persistent data storage device such as the flash memory 110. Additional applications may be loaded onto the portable electronic device 100 through the wireless network 150, the auxiliary I/O subsystem 124, the data port 126, the short-range communications subsystem 132, or any of the other device subsystem 134 suitable for this purpose.

In use, a received signal such as a text message, an e-mail message, web page download, or other data may be processed by the communication subsystem 104 and provided to the processor 102. The processor 102 then processes the received signal for output to the display 112 or alternatively to the auxiliary I/O subsystem 124. A subscriber may also compose data items, such as e-mail messages, for example, which may be transmitted over the wireless network 150 through the communication subsystem 104.

For voice communications, the overall operation of the portable electronic device 100 may be similar. The speaker 128 may output audible information converted from electrical signals, and the microphone 130 may convert audible information into electrical signals for processing and transmittal.

Turning now to FIGS. 2 to 8, illustrated therein is a portable electronic device 200 according to one embodiment. The portable electronic device 200 is a slidable device and generally includes a first portion (shown here as a display portion 202), a second portion (shown here as a keypad portion 204), and a third portion (shown here as a slide portion 205) that is coupled to both the display portion 202 and keypad portion 204.

Generally the display portion 202, keypad portion 204, and slide portion 205 are sized and shaped so that the display portion 202 can move between a "closed position" wherein the display portion 202 covers at least a portion of the keypad portion 204 (e.g. the display portion 202 covers a surface S2 of the keypad portion 204 as shown in FIG. 4), and an "open position" wherein the surface S2 of the keypad portion 204 is exposed and a surface S1 of the display portion 202 is aligned with the surface S2 of the keypad portion 204 (as shown in FIG. 5).

In particular, the slide portion 205 and display portion 202 are slidably coupled so that the display portion 202 may be moved from the closed position along a first direction L to an extended position (as shown generally in dashed line 202d in FIGS. 4 and 5). When the display portion 202 has moved to the extended position 202d, the surface S2 of the keypad portion 204 is at least partially exposed. Furthermore, the surface S1 of the display portion 202 remains offset in front of the surface S2 of the keypad portion 204.

The slide portion 205 is also slidably coupled to the keypad portion 204 so that when the display portion 202 is sufficiently extended (e.g. into the extended position 202d), the display portion 202 and slide portion 205 can be moved in a second direction D so that the surface S1 of the display portion 202 and the surface S2 of the keypad portion 204 can be aligned or flush (as shown in FIG. 5). In effect, the display portion 202 may be "dropped down" (e.g. along the z-direction) so that the two surfaces S1 and S2 align or are generally coplanar.

In this embodiment, the first direction L is generally aligned with the longitudinal axis of the portable electronic device 200, along the y-direction in the illustrated coordinate system. In other embodiments, the first direction may be in another direction, such as transverse to the longitudinal axis of the portable electronic device 200 (e.g. in the direction R as shown in FIGS. 9 to 12 and described below).

The second direction D has a component that extends normal to (or in a direction that is parallel to one of the normal vectors of) the surface S1 of the display portion 202 (e.g. along the z-axis). As shown, the second direction D may be angularly offset from the z-direction by a slide angle $\phi$ (shown in FIG. 4), which in some embodiments may be greater than zero. Accordingly, as the display portion 202 and slide portion 205 are moved in the second direction D, the display portion 202 and slide portion 205 will move along both the z-axis by an amount proportional to the cosine of the slide angle $\phi$, and along a direction aligned with the first direction L (e.g. the y-axis) by an amount proportional to the sine of the slide angle $\phi$. Generally, the second direction D can be described as having a component aligned with the first direction L (e.g. the y-component) and another component aligned with a direction that is normal to the surface S1 of the display portion 202 (e.g. the z-component).

Selecting a slide angle $\phi$ greater than zero may allow for easier mechanical coupling between the display portion 202, the keypad portion 204, and the slide portion 205. Furthermore, when the slide angle $\phi$ is greater than zero, an upward force on the display portion 202 (e.g. a user's thumb or finger pushing on the display portion 202 along the first direction L) will tend to push the display portion 202 in the second direction D. This may make it easier for a user to move the display portion 202 to the open position.

In some embodiments the slide angle $\phi$ may be between 15 degrees and 75 degrees. In some embodiments the slide angle $\phi$ may be between 30 degrees and 60 degrees. In some embodiments the slide angle $\phi$ may be approximately 45 degrees.

In other embodiments, the slide angle $\phi$ may be less than zero (e.g. the slide angle $\phi$ may be negative).

As shown in FIG. 4, the display portion 202 has a thickness T. Accordingly, when moving the display portion 202 to the open position to align the first and second surfaces S1 and S2, the slide portion 205 moves along the z-direction by a distance approximately equal to T. This means that the slide portion 205 should be moved in the second direction D by distance equal to the distance T divided by the cosine of the slide angle $\phi$.

Figure 8:
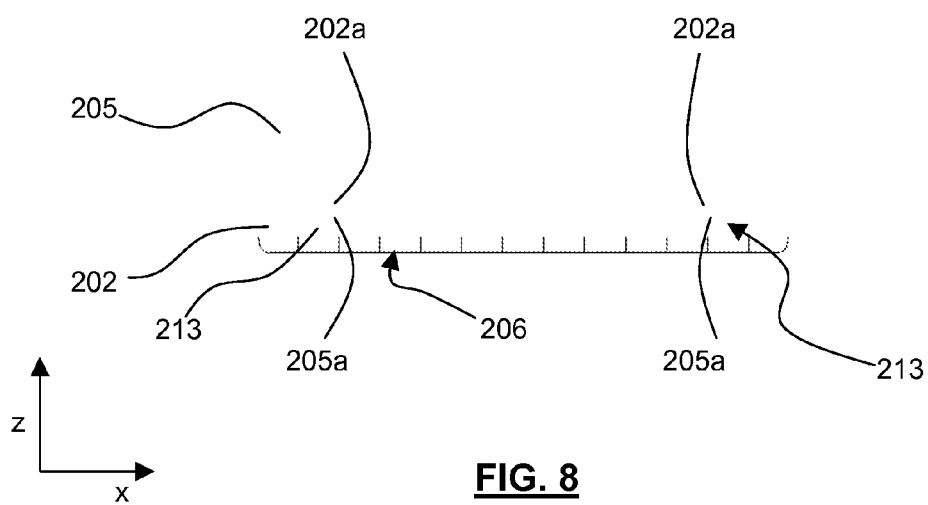
FIG. 8 is a cross-sectional top view of the portable electronic device of FIG. 2 taken through line 8-8 showing the first slide mechanism between the display portion and the slide portion.

The display portion 202, keypad portion 204 and slide portion 205 may be slidably coupled together using various techniques. For example, as shown in FIG. 8, the keypad portion 202 and slide portion 205 may be slidably coupled together using a first slide mechanism 213 that includes slide rails 202a on the display portion 202 and corresponding interlocking slide rails 205a on the slide portion 205. The slide rails 202a, 205a cooperate to allow relative movement between the display portion 202 and the slide portion 205 along the first direction L (e.g. along the y-axis) but inhibit movement in the x and z directions.

Similarly, the slide portion 205 and keypad portion 204 may be slidably coupled together using a second slide mechanism 219 (as shown in FIG. 5), which may also include interlocking slide rails similar to slide rails 202a, 205a. The second slide mechanism 219 allows for relative movement between the slide portion 205 and the keypad portion 204 along the second direction D so that the surfaces 51 and S2 of the display portion and keypad portion 204 can be aligned or made flush. In this embodiment, the second slide mechanism 219 is inclined upwardly (from front to back of the device 200) so as to define the slide angle φ.

In some embodiments, one or both of the slide mechanisms 213 and 219 may have other configurations, for example, a tongue in groove arrangement that allows sliding movement between the display portion 202, the keyboard portion 204 or the slide portion 205.

In some embodiments, one or both of the first slide mechanism 213 and second slide mechanism 219 may include a biasing member (e.g. a spring, such as a compression or extension spring, or another biasing member). The biasing member(s) may help encourage at least one of the slide portion 205 and display portion 202 to move between one or more of the open position, the extended position 202d, and the closed position. For example, a spring 221 may be compressed when the portable electronic device 200 is in the closed position (see FIG. 4) and extended when the portable electronic device 200 is in the open position (see FIG. 5).

In some embodiments, one or more locking members, locks or latches (e.g. mechanical locks, magnets, etc.) may be provided in one or more of the display portion 202, keypad portion 204 and slide portion 205 to help retain the portable electronic device in one or more of the closed position, the extended position 202d, and the open position. For example, as shown in FIGS. 4 and 5, magnets 215a, 215b in the display portion 202 and the slide portion 205 (respectively) may attract each other and help retain the device 200 in the closed position, but may not substantially interact with each other when the device 200 is in the open position.

When moving the display portion 202 from the closed position (shown in FIG. 2) to the open position (shown in FIG. 3), a user may push upwardly on the display portion 202 (e.g. towards a top end 202b of the display portion 202 using their thumb or finger), causing the display portion 202 to slide upwardly along the first direction L. In some embodiments, this movement may be facilitated by a biasing member (e.g. a spring).

Once the display portion 202 moves to the extended position 202d, the bottom end 202c of the display portion 202 is clear of an edge of corner 204a of the surface S2 of the keypad portion 204, and the display portion 202 can then be moved in the second direction D to align the surfaces S1 and S2.

In some embodiments, the movement in the second direction D may be effected by the user continuing to push upwardly on the display portion 202. In some embodiments, movement in the second direction D may be at least partially assisted by a biasing member (e.g. a spring) that biases the slide portion 205 along the second direction D into the open position. Once in the open position, a locking mechanism (e.g. a latch or magnet) may help retain the portable electronic device 200 in the open position.

In some embodiments, the bottom end 202c of the display portion 202 may include a recessed portion 209 adapted to facilitate clearance of the display portion 202 past the corner 204a of the keypad portion 204.

When the user wants to move the portable electronic device 200 back to the closed position (e.g. to close the portable electronic device 200), the user may press the back of the slide portion 205, moving the display portion 202 and slide portion 205 along the second direction D back into the extended position, and then sliding the display portion 202 downwards to cover the keypad portion 204. In some embodiments, springs or other biasing members may help facilitate closing of the portable electronic device 200, and one or more locks may help retain the portable electronic device 200 in the closed position.

In some embodiments, the first and second surfaces S1 and S2 are "active" surfaces in that they may include one or more input or output devices (or both), such as display screens, buttons, etc. For example, the first surface S1 could be the surface of the display 206, and the second surface S2 could be the surface of the keypad 220, input devices 212, or another portion of the keypad portion 204.

Aligning the "active" surfaces S1 and S2 when the portable electronic device 200 is open may be beneficial. For example, user interaction with the portable electronic device 200 may be improved as a user may be able to transition from engaging the first surface S1 (e.g. touching the display 206 using a finger) to engaging the second surface S2 (e.g. input devices 212 or keypad 220 on the second surface S2 of the keypad portion 204) generally without encountering discontinuities, such as a lip or stepped portion.

While the portable electronic device 200 has been described with respect to a touch screen display 206 and a keypad 220, the portable electronic device 200 may include other input and output devices, and may have other configurations as will be appreciated from the following description of some more exemplary input and output devices.

In some embodiments, the display 206 could be an LCD display with touch screen capabilities. For example, the display 206 could be the display 118 as generally described above. In some other embodiments, the display 206 may not be a touch screen display.

The portable electronic device 200 may include other input devices, such as navigation keys or buttons, a physical or virtual keyboard, a trackpad, a trackball, multimedia keys, etc. For example, in this embodiment the keypad portion 204 includes one or more input devices 212, which could include an optical navigation module (e.g. a trackpad), buttons, such as a phone application button, a home screen button, etc. In some embodiments, these input devices may include optical sensors, mechanical buttons, "soft keys", or various combinations thereof.

In some embodiments, the keypad 220 may include a plurality of alphanumeric keys for inputting data into and controlling the portable electronic device 200. In some embodiments, the keys may represent an alphabet and may be arranged with a standard keyboard layout (e.g. QWERTY, QWERTZ, DVORAK, etc.) or according to other particular patterns. In some embodiments, the keypad 220 could be a physical keypad 220 with mechanical keys. In other embodiments, the keypad 220 could be a touch screen with soft keys.

Figure 2:
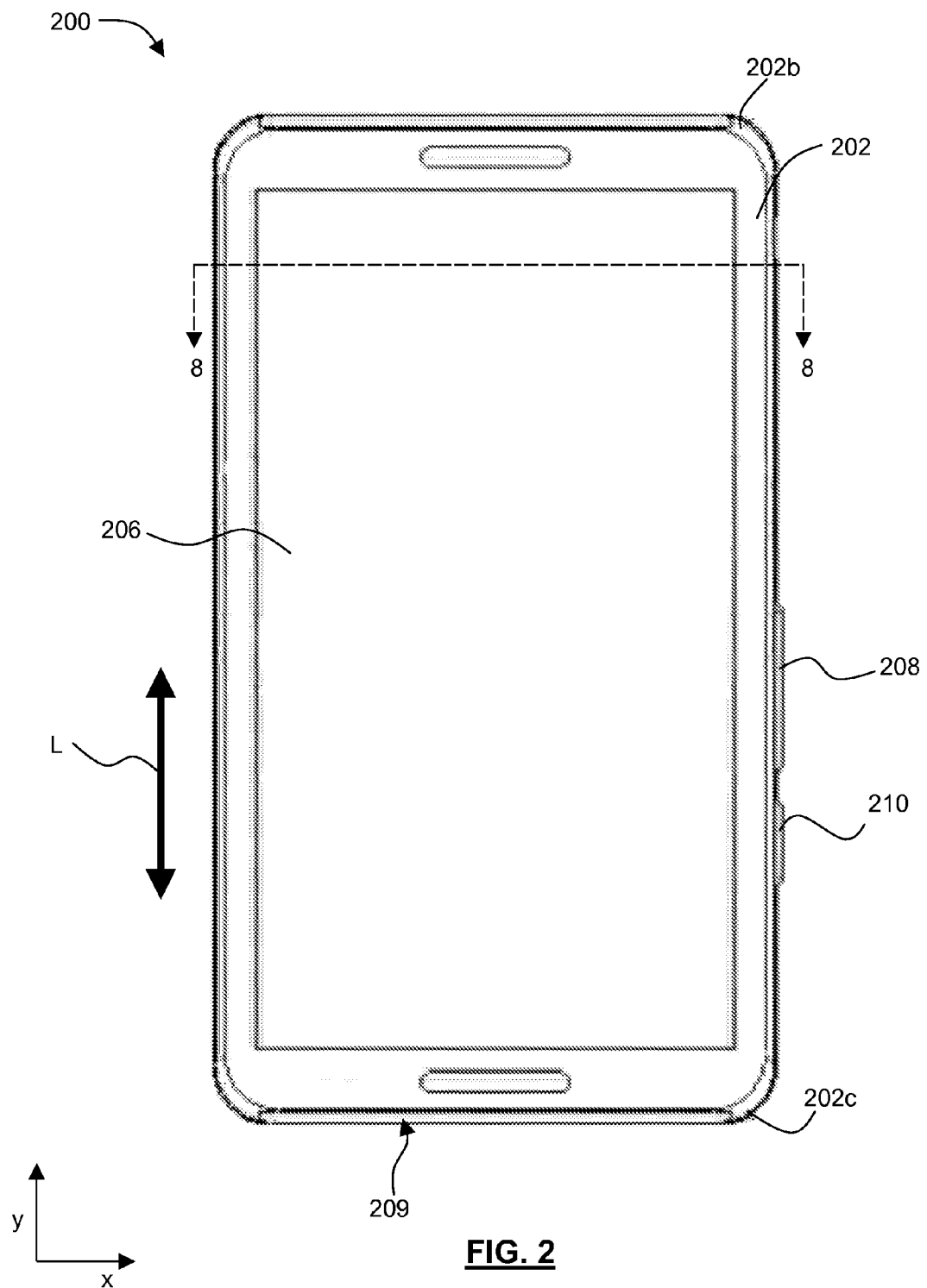
FIG. 2 is a front view of a portable electronic device according to one embodiment shown in a closed position.
Figure 3:
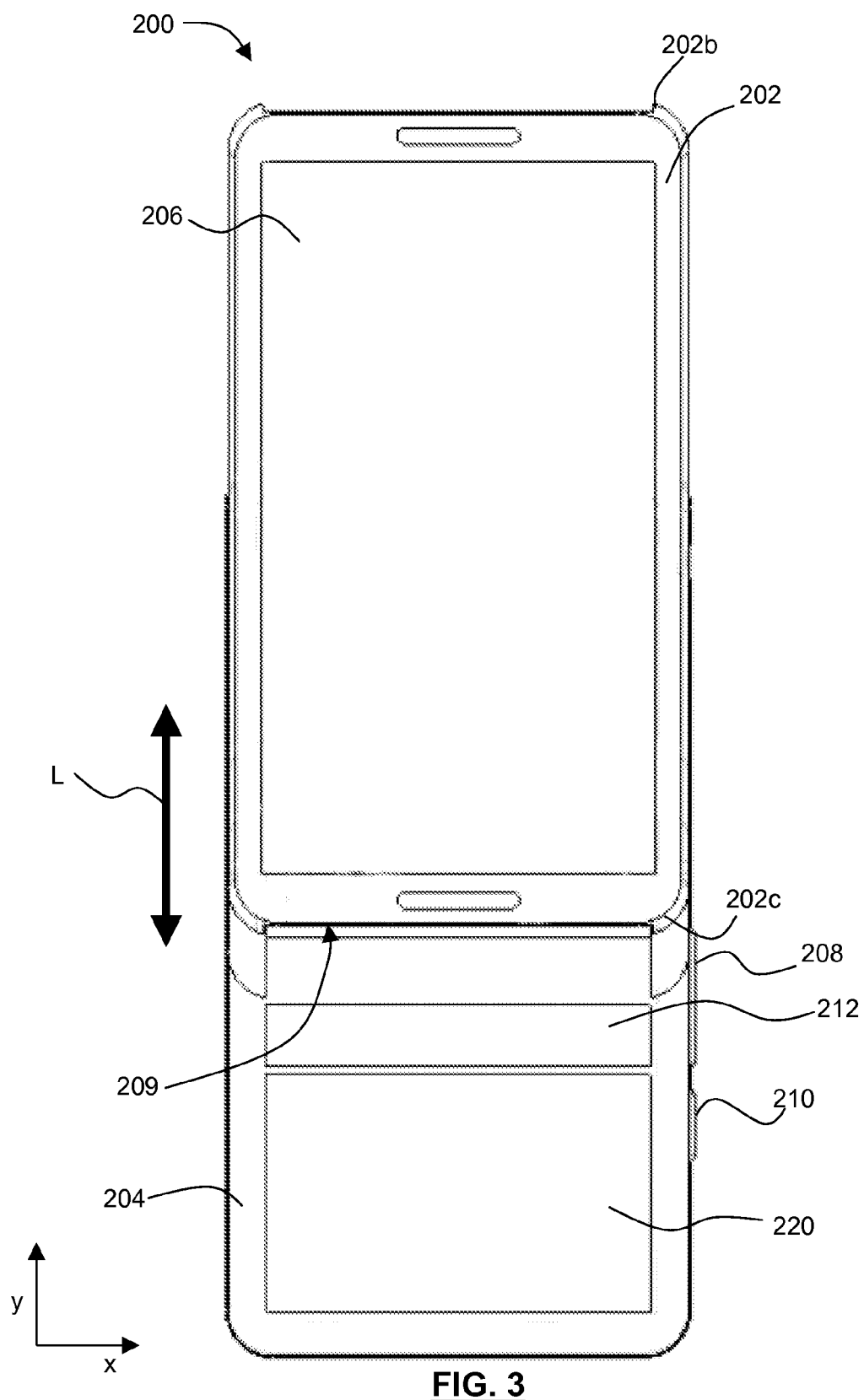
FIG. 3 is a front view of the portable electronic device of FIG. 2 shown in an open position.
Figure 6:
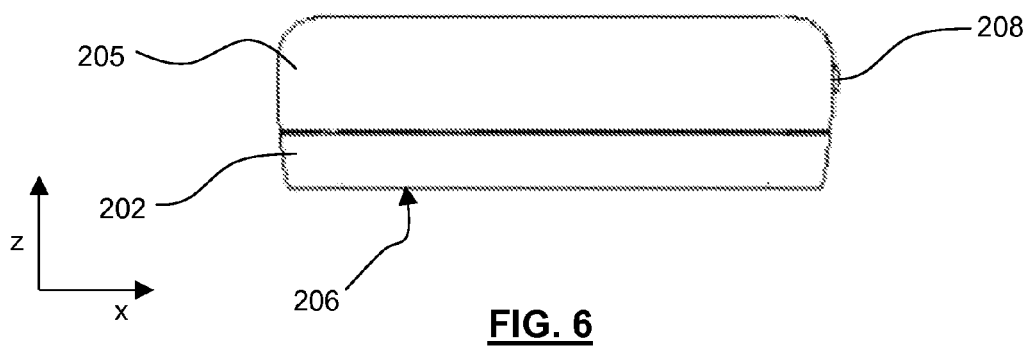
FIG. 6 is a top view of the portable electronic device of FIG. 2 shown in the closed position.
Figure 7:
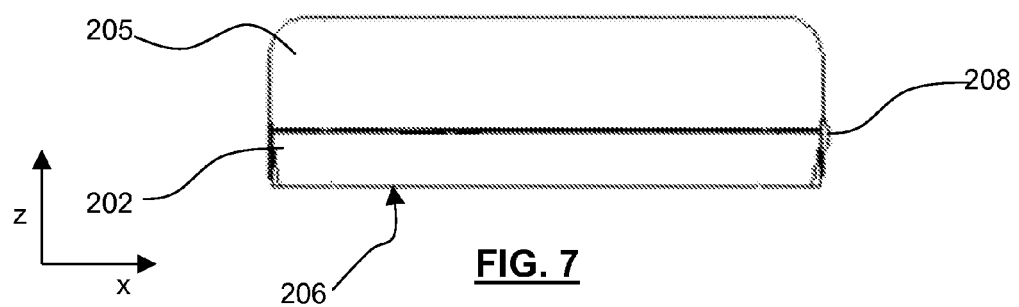
FIG. 7 is a top view of the portable electronic device of FIG. 2 shown in the open position.

As shown in FIGS. 3 and 5, when the portable electronic device 200 is in the open position, the keypad 220 on the keypad portion 204 may be exposed for user access. As shown in FIGS. 2 and 4, when the portable electronic device 200 is in the closed position, the keypad 220 is generally covered by the display portion 202. This may be beneficial as it may protect the keypad 220 when not in use, and may also inhibit undesired keys from being pressed when a user is carrying the portable electronic device 200 (e.g. in a pocket).

In some embodiments, the keypad portion 204 includes physical buttons 208 and 210 on a side of the keypad portion 204. In some embodiments, buttons 208, 210 could be used for navigation, volume control, or for other purposes. The portable electronic device 200 as shown also includes an audio jack 217 on the side of the slide portion 205, which may be used to couple the portable electronic device 200 to a speaker, a microphone, etc. In some embodiments, the slide portion 205 may include other input and output devices.

In some embodiments (e.g. when the display 206 is a touch screen), the user may be able to perform functions on the portable electronic device 200 when closed, for example, by interacting with the accessible input devices (e.g. buttons 208, 210, the display screen 206, etc.). Then, when the device 200 is open, functions can be performed using other input devices, such as the input devices 212 and keypad 220.

Figure 9:
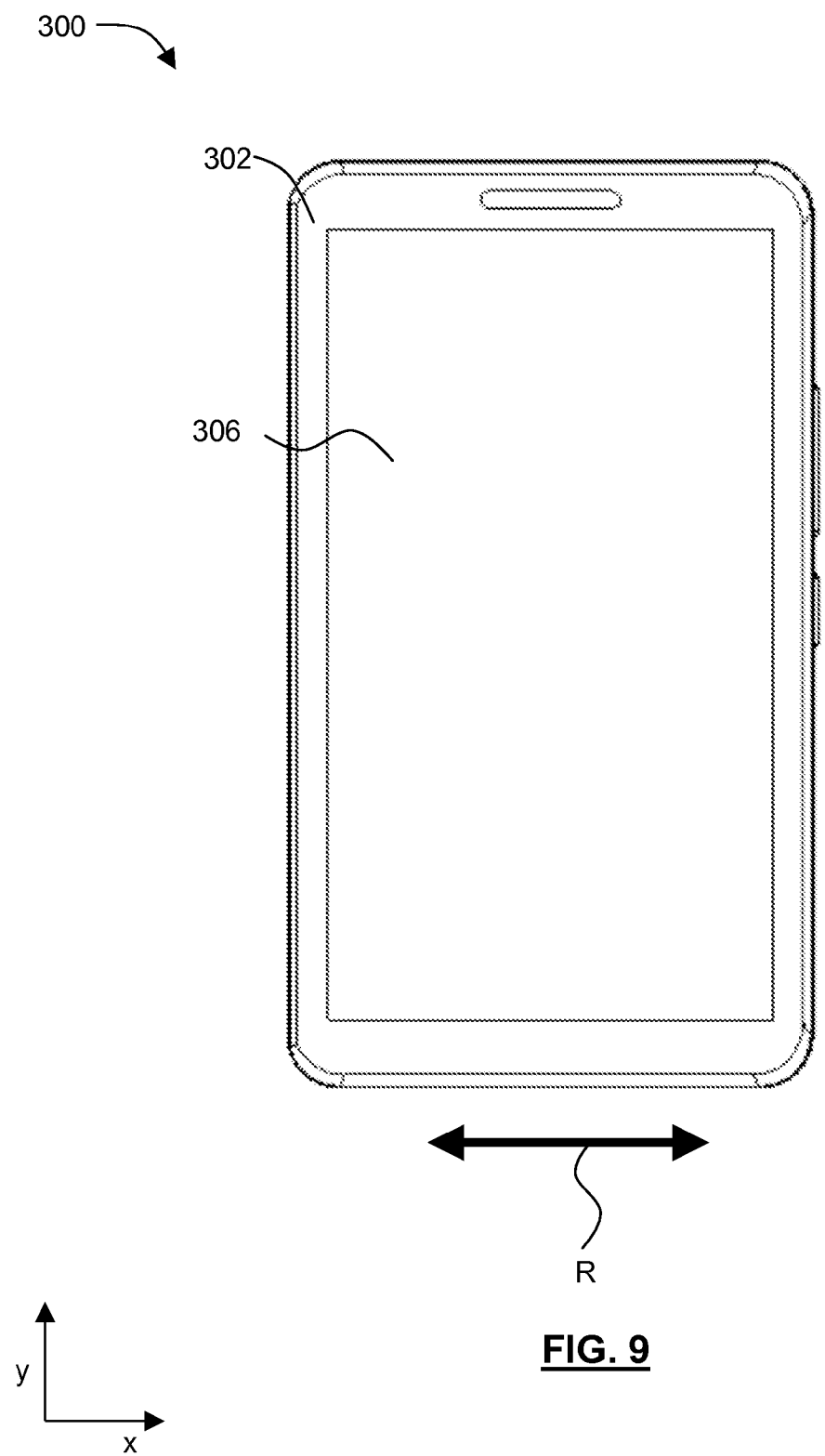
FIG. 9 is a front view of a portable electronic device according to another embodiment shown in a closed position.
Figure 10:
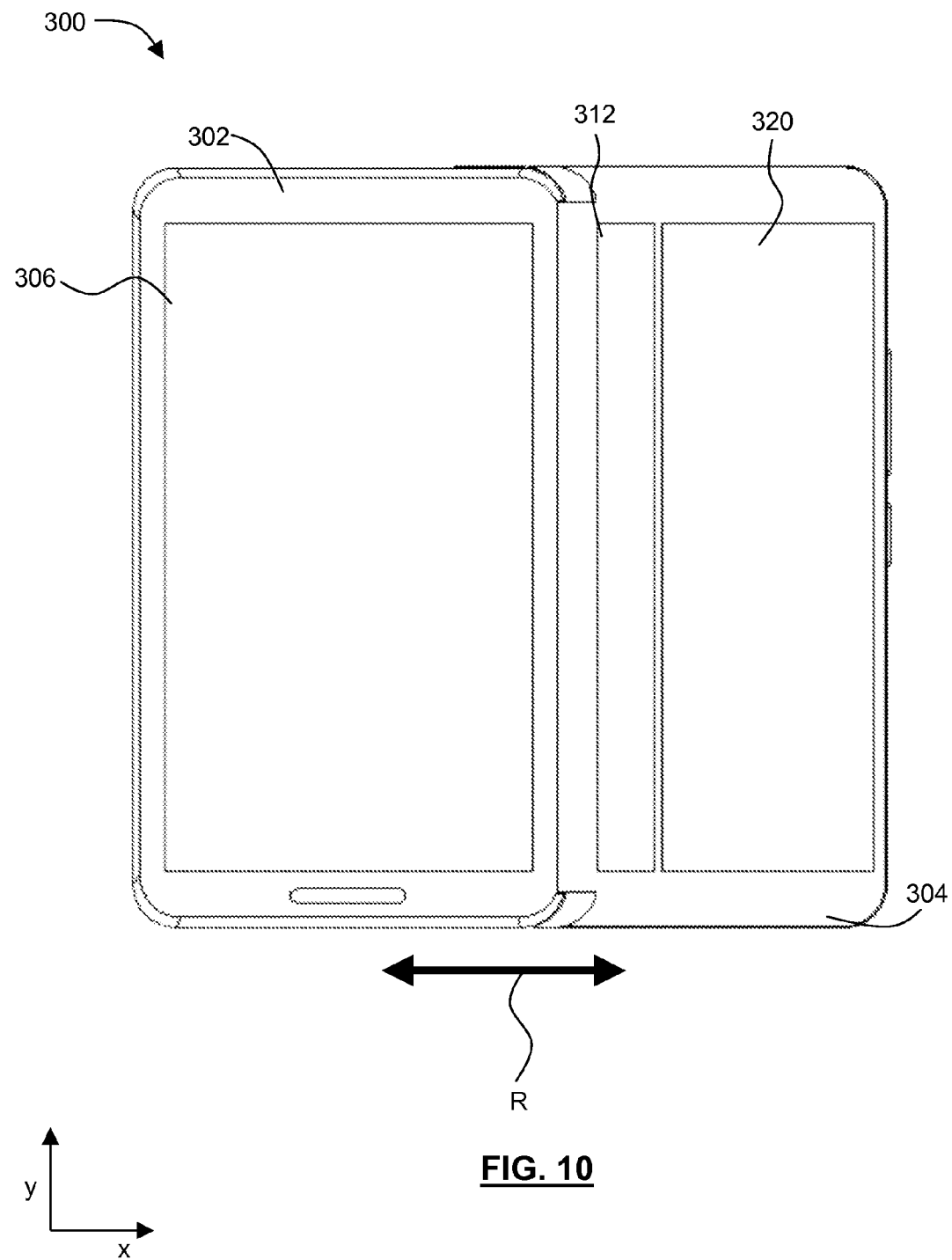
FIG. 10 is a front view of the portable electronic device of FIG. 9 shown in an open position.
Figure 11:
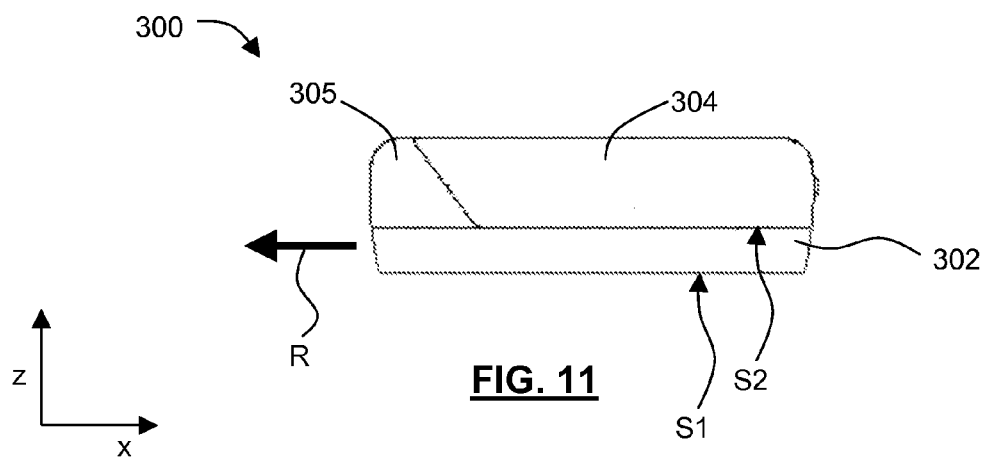
FIG. 11 is a top view of the portable electronic device of FIG. 9 shown in the closed position.
Figure 12:
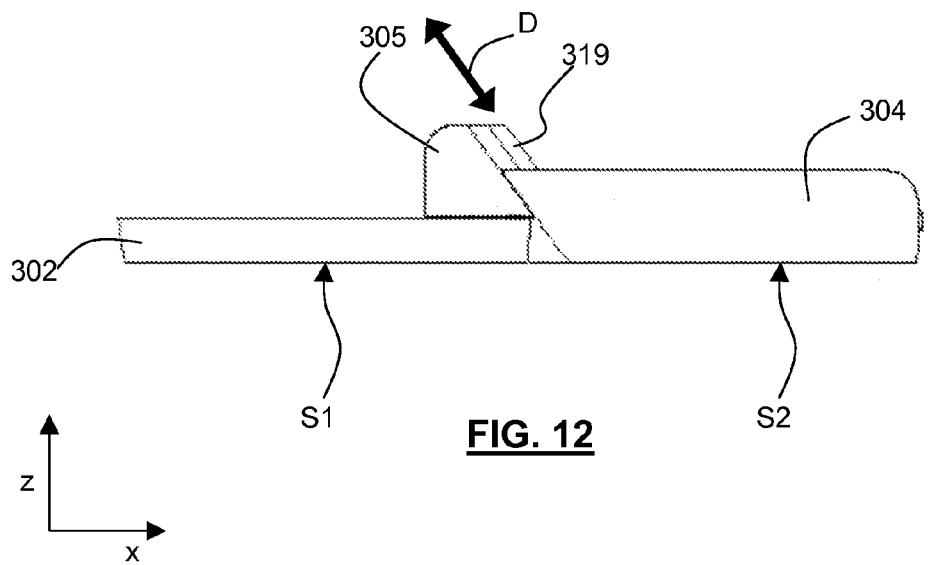
FIG. 12 is a top view of the portable electronic device of FIG. 9 shown in the open position.

Turning now to FIGS. 9 to 12, illustrated generally therein is a portable electronic device 300 according to another embodiment. The portable electronic device 300 is generally similar to the portable electronic device 200 described above. In particular, the portable electronic device 300 includes a first portion (e.g. a display portion 302), a second portion (e.g. a keypad portion 304), and a third portion (e.g. a slide portion 305) that is slidably coupled to both the display portion 302 and keypad portion 304 so that the display portion 302 can move between a closed position wherein the display portion 302 covers at least a portion of the keypad portion 304 as shown in FIGS. 9 and 11), and an open position (as shown in FIGS. 10 and 12) wherein the surface S2 of the keypad portion 304 is at least partially exposed and the surfaces S1, S2 of the display portion 302 and keypad portion 304 are aligned or flush. In some embodiments, the display 306 may be a touch screen display and the keypad portion 304 may include input devices 312 and a keypad 320 with a plurality of keys.

However, in this embodiment the display portion 302 is adapted to move in a first direction R that is generally transverse to the longitudinal direction of the portable electronic device 300 (e.g. in a direction along the x-axis). Then, once the display portion 302 is sufficiently extended, the display portion 302 can be moved in a second direction D (e.g. using a slide mechanism 319) so that the surface S1 of the display portion 302 can be aligned with the surface S2 of the keypad portion 304. Accordingly, this portable electronic device 300 may be operated with the keypad 320 and display 306 in a "landscape" mode when open (as opposed to the portable electronic device 200 which operates in a "portrait" mode when open). The mechanisms for the device 300 which enable the display portion 302 to be moved relative to the keyboard portion 304 may be the same as that described above with respect to the device 200, and therefore will not be described in any detail herein.

In some other embodiments, a portable electronic device may be provided that can slide in both a longitudinal and transverse directions, so that the device can be selectively operated in either a landscape mode or portrait mode.

While reference has been made herein to portable electronic devices wherein a first portion is a display portion, a second portion is a keypad portion, and a third portion is a slide portion, this is not meant to be limiting and other configurations are possible. For example, the first portion and second portion may both be touchscreen portions with no keypad. In other examples, the first portion may have a keypad and the second portion may include a display.

While the above description provides examples of one or more processes or apparatuses, it will be appreciated that other processes or apparatuses may be within the scope of the accompanying claims.

The invention claimed is:

1. A portable electronic device, comprising:
a display portion having a first front surface;
a keypad portion having a second front surface and a back surface opposite the second front surface; and
an external slide portion sized and shaped to be held by a user's hand, the slide portion having a third front surface and a back surface opposite the third front surface, the slide portion being slidably coupled to the display and keypad portions;

wherein the display portion is linearly movable relative to the keypad portion and slide portion in a first direction parallel to the first front surface and the second front surface between a closed arrangement and an extended arrangement;

wherein, in the closed arrangement, the keypad portion and slide portion are disposed such that the third front surface of the slide portion is coplanar with the second front surface of the keypad portion, and the display portion overlies the keypad portion;

wherein, in the extended arrangement, the third front surface of the slide portion is coplanar with the second front surface of the keypad portion, and the keypad portion is at least partially exposed;

wherein the display portion and the slide portion are movable relative to the keypad portion in a second direction at an acute angle to an axis perpendicular to the first front surface between the extended arrangement and an open arrangement; and wherein, in the open arrangement, the first front surface of the display portion is coplanar with the second front surface of the keypad portion, the third front surface of the slide portion is offset rearwardly relative to second first front surface of the keypad portion, and the back surface of the slide portion is offset rearwardly relative to the back surface of the keypad portion.

2. The portable electronic device of claim 1, wherein the display portion includes a display.

3. The portable electronic device of claim 1, wherein the keypad portion includes a keypad.

4. The portable electronic device of claim 1, wherein the first direction is aligned with a longitudinal axis of the portable electronic device.

5. The portable electronic device of claim 1, wherein the first direction is transverse to a longitudinal axis of the portable electronic device.

6. The portable electronic device of claim 1, wherein the second direction has a component normal to the first surface of the display portion.

7. The portable electronic device of claim 1, wherein the second direction is inclined upwardly by a slide angle and has a component aligned with the first direction.

8. The portable electronic device of claim 7, wherein the slide angle is between 15 and 75 degrees.

9. The portable electronic device of claim 7, wherein the slide angle is between 30 and 60 degrees.

10. The portable electronic device of claim 1, wherein the display portion and keypad portion are slidably coupled together using a first slide mechanism.

11. The portable electronic device of claim 1, wherein the keypad portion and slide portion are slidably coupled together using a second slide mechanism.

12. The portable electronic device of claim 1, further comprising at least one biasing member for biasing the portable electronic device to at least one of the closed arrangement, the extended arrangement, and the open arrangement.

13. The portable electronic device of claim 12, wherein the at least one biasing member includes a spring.

14. The portable electronic device of claim 1, further comprising at least one locking member for retaining the portable electronic device in at least one of the closed arrangement, the extended arrangement, and the open arrangement.

15. The portable electronic device of claim 14, wherein the at least one locking member includes at least one magnet.

16. The portable electronic device of claim 1 wherein a bottom end of the display portion includes a recessed portion adapted to facilitate clearance of the display portion past the keypad portion.

17. A portable electronic device, comprising:
- a display portion having a first front surface;
- a keypad portion having a second front surface and a back surface opposite the second front surface;
- an external slide portion sized and shaped to be held by a user's hand, the slide portion having a third front surface and a back surface opposite the third front surface;
- a first slide mechanism slidably coupling the slide portion to the display portion;
- a second slide mechanism slidably coupling the slide portion to the keypad portion;
- wherein the first slide mechanism permits linear movement of the display portion relative to the keypad portion and slide portion in a first direction parallel to the first front surface between a closed arrangement and an extended arrangement;
- wherein, in the closed arrangement, the keypad portion and slide portion are disposed such that the third front surface of the slide portion is coplanar with the second front surface of the keypad portion, and the display portion overlies the keypad portion;
- wherein, in the extended arrangement, the third front surface of the slide portion is coplanar with the second front surface of the keypad portion, and the keypad portion is at least partially exposed;
- wherein the second slide mechanism permits the display portion and the slide portion to move relative to the keypad portion in a second direction at an acute angle to an axis perpendicular to the first front surface between the extended arrangement and an open arrangement; and
- wherein, in the open arrangement, the first front surface of the display portion is coplanar with the second front surface of the keypad portion, the third front surface of the slide portion is offset rearwardly relative to second first front surface of the keypad portion, and the back surface of the slide portion is offset rearwardly relative to the back surface of the keypad portion.

18. The portable electronic device of claim 17, wherein the first slide mechanism includes first slide rails on the first portion and corresponding interlocking slide rails on the slide portion.

19. The portable electronic device of claim 18, wherein the slide rails cooperate to allow relative movement between the first portion and the slide portion along the first direction but inhibit movement in other directions.

20. A portable electronic device, comprising:
- a first portion having a first surface;
- a second portion having a second surface and a back surface opposite the second surface; and
- an external slide portion sized and shaped to be held by a user's hand, the slide portion having a third surface and a back surface opposite the third surface, the slide portion being slidably coupled to the display and second portions;
- wherein the first portion is linearly movable relative to the second portion and slide portion in a first direction parallel to the first surface and the second surface between a closed arrangement and an extended arrangement;
- wherein, in the closed arrangement, the second portion and slide portion are disposed such that the third surface of the slide portion is coplanar with the second surface of the second portion, and the first portion overlies the second portion;
- wherein, in the extended arrangement, the third surface of the slide portion is coplanar with the second surface of the second portion, and the second portion is at least partially exposed;
- wherein the first portion and the slide portion are movable relative to the second portion in a second direction between the extended arrangement and an open arrangement; and
- wherein, in the open arrangement, the first surface of the first portion is coplanar with the second surface of the second portion, the third surface of the slide portion is offset rearwardly relative to second first surface of the second portion, and the back surface of the slide portion is offset rearwardly relative to the back surface of the second portion.

* * * * *